United States Patent Office 3,502,895
Patented Mar. 24, 1970

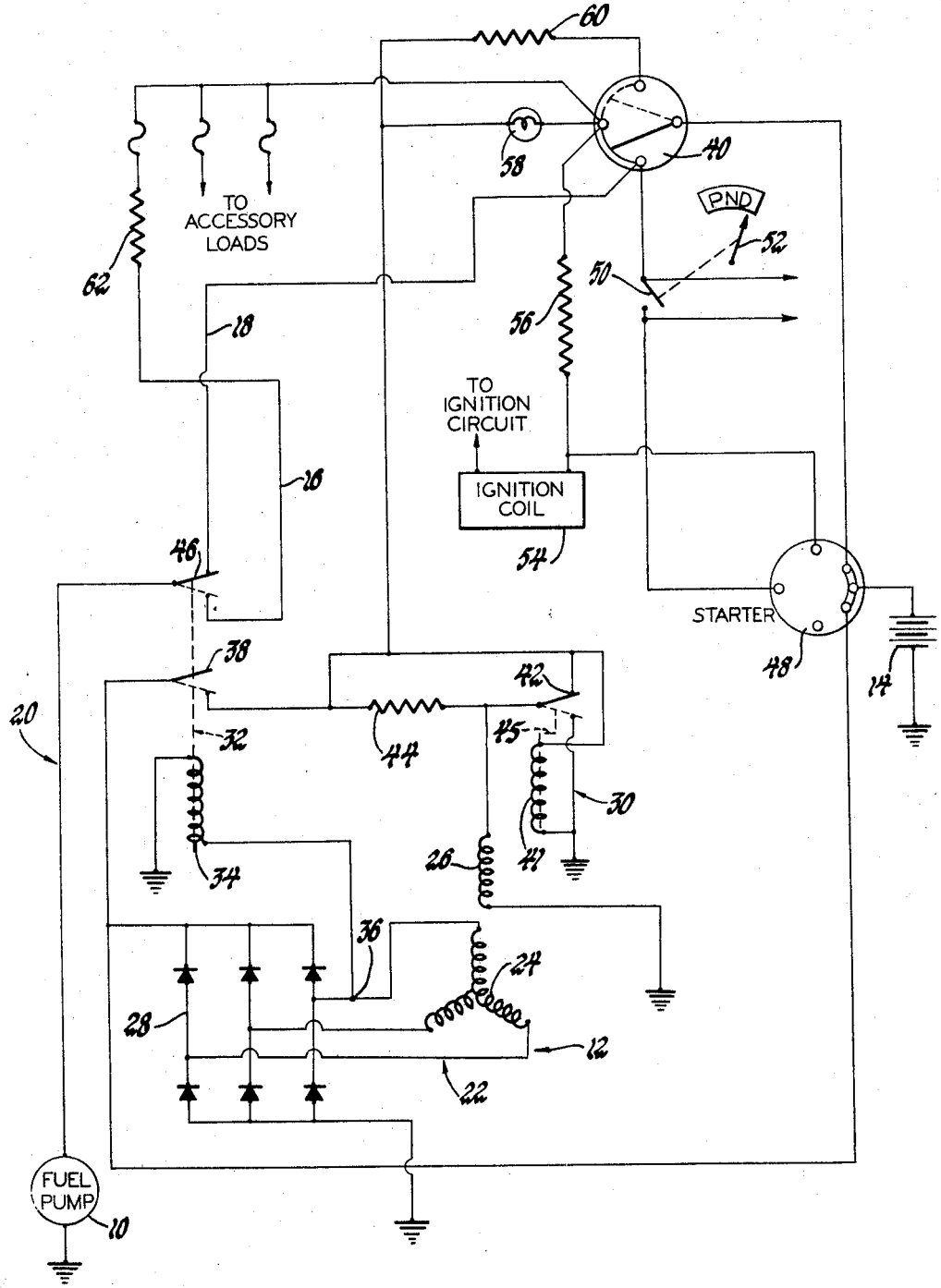

3,502,895
ELECTRIC FUEL PUMP CONTROLS
Richard P. Ballou, Howell, Mich., assignor to General Motors Corporation, Detroit, Mich., a corporation of Delaware
Filed Dec. 22, 1967, Ser. No. 692,735
Int. Cl. F02n 11/04; H02p 9/04
U.S. Cl. 290—36                                      7 Claims

ABSTRACT OF THE DISCLOSURE

A vehicle electric fuel pump control that utilizes an AC generator's circuitry to connect the fuel pump either to the battery when the engine is being cranked or to the AC generator's output when the engine is operating. The control also utilizes the vehicle's transmission selector to permit selective operation of the pump without the engine operating or being cranked.

DISCLOSURE

This invention relates to controls for electric fuel pumps adapted, although not exclusively, for use with engine-driven vehicles.

An electric fuel pump for an engine requires power when the engine is being cranked so as to provide fuel for starting and also, of course, requires power when the engine is operating. If the engine stalls or is stopped, the power to the fuel pump must be turned off so that the fuel pump will cease operating.

In general, electric fuel pump controls for accomplishing the foregoing have been complicated. Consequently, the combining of the fuel pump control with the engine's existing power supply system becomes difficult and costly.

With this problem and others in mind, there is proposed a unique electric fuel pump control that can be combined with a conventional DC generating system of the type employing an AC generator with a minimum of change in the generating system. Also proposed is an electric fuel pump control that involves a minimum of components and that can utilize existing components in this conventional DC generating system. Further proposed is a fuel pump control that causes the fuel pump to operate both when the engine is being cranked and when the engine is operating, but quickly cuts off the power to the fuel pump when the engine is not operating. Additionally and without additional controls, the fuel pump can be selectively operated without either cranking the engine or operating the engine so that depleted fuel lines can be filled after the fuel tank is allowed to become empty or the fuel lines have drained because the engine has not been operated for a long period of time. Also proposed is a fuel pump control that precludes premature disconnection of the fuel pump operating power during engine cranking.

Briefly, according to one embodiment of the invention, the vehicle's DC generating system's field relay is employed as a part of the control for the vehicle's electric fuel pump. When the field relay is deenergized because the DC generating system is inoperative, the field relay operates a switch to connect the fuel pump to the vehicle battery provided an engine operating switch is in its engine cranking setting. This permits the engine to be supplied with fuel when the engine is being cranked. When the DC generating system is operating and developing an output the field relay is energized by this output. The energized field relay again operates the switch to disconnect the fuel pump from the battery and to connect it to the output from the DC generating system, again provided the engine operating switch is in an appropriate setting. The vehicle's transmission is also employed and provides selective control of the fuel pump. When the transmission selector is in its vehicle drive setting a neutral switch is opened which permits battery power to be supplied to the fuel pump without the engine being cranked or running.

The foregoing and other objects and advantages of the invention will become apparent from the following description and the accompanying drawing in which the single figure illustrates an electric fuel pump control incorporating the principles of the invention.

Referring now to the details of the system, the numeral 10 denotes an electric fuel pump suitable for supplying fuel to a motor vehicle engine. The fuel pump 10 is driven by a DC motor and may be of the type disclosed in United States application Ser. No. 645,150 to Shultz et al., filed June 12, 1967. The DC power for operating the fuel pump 10 is derived from the vehicle's DC generating system, designated generally at 12, or the vehicle's battery, denoted by the numeral 14. The connection of the fuel pump 10 to the DC generating system 12 and the battery 14 is made respectively by parallel DC generating system supply and battery supply branches 16 and 18 of a fuel pump power supply circuit 20. As will be explained, the battery 14 provides the DC power for operating the fuel pump 10 when the engine is being cranked and the DC generating system 12 provides the DC power when the engine is operating unless the system's output is less than that of the battery 14. If less, the battery 14 will supply the DC power.

The DC generating system 12 may be of any commercially available type utilizing an AC generator. The type illustrated is the well-known Delcotron generator manufactured by the Delco-Remy Division of the General Motors Corporation. Briefly, the illustrated system 12 utilizes an AC generator 22, having Y-connected stator windings 24 and a field winding 26 that combine in a well-known way to develop a three-phase AC output. A rectifier 28, comprising six diodes, changes this three-phase AC output to a DC output, which is used to charge the battery 14 and to supply the DC power requirements for operating the vehicle and its accessories. The DC generating system 12 also includes a voltage regulator 30 and a field relay 32. The field relay 32 has its winding 34 connected to a terminal 36 of the AC generator 22. On the Delcotron generator this is known as the R terminal. The voltage at the terminal 36 is on the average approximately seven volts in a twelve-volt system and is the result of half-wave rectification of one phase of the three-phase output from the AC generator 22. As should be appreciated, the field relay winding 34 could be energized by some other voltage, depending on the specific internal connections of the AC generator 22; it is only necessary that this voltage signify the operation or non-operation of the generator.

When the engine is operating and the AC generator 22 is developing an output, the potential at the terminal 36 will energize the field relay winding 34 and cause a field winding control switch, such as field relay switch contacts 38, to close. This connects the rectified output from the rectifier 28 directly to the field winding 26 of the AC generator 22 by way of the voltage regulator 30. Prior to this the AC generator field winding 26 is supplied with power from the battery 14 by way of an engine operating or ignition switch 40, as will be explained.

The operation of the voltage regulator 30 will now be apparent for initially battery potential is applied to the voltage regulator winding 41 and is also applied to the AC generator field winding 26 by way of the voltage regulator relay contacts 42. But when the AC generator 22 is operating and the field relay contacts 38 have closed, the voltage regulator winding 41 is energized by the rectified output from the AC generator 22. As the speed of the AC generator 22 increases, its rectified output increases and the voltage regulator contacts 42 open. Consequently, the field winding 26 is provided with a potential that is reduced by a voltage dropping resistor 44 and this reduced potential in turn reduces the output from the AC generator 22. As the speed of the AC generator 22 increases still further, the armature 45 will move to the illustrated broken line position and connect the other end of the field winding 26 also to ground so that no current passes through it. This reduces the output from the AC generator 22 further and the voltage regulator contacts 42 will close. Current is again supplied to the field winding 26 until the output from the AC generator 22 once more increases and the voltage regulator contacts reopen. This cycle continuously repeats itself so as to limit the output to a selected value; e.g., fourteen volts.

The fuel pump power supply circuit 20 also includes a field relay operated fuel pump control switch 46 that in its depicted solid line position connects the battery supply branch 18 to the fuel pump 10 and in its depicted broken line position connects the DC generating system supply branch 16 to the fuel pump 10. The construction of this switch 46 may have many different forms. For example and as depicted, a single pole-double throw switch with the field relay armature including an additional movable contact that would be in the solid line position when the field relay winding 34 is deenergized, and in the broken line position when the field relay winding 34 is energized.

Common to both the DC generating system supply branch 16 and the battery supply branch 18 is the ignition switch 40. The ignition switch 40 has an engine starting or cranking setting shown in the solid line and an engine operating or running setting shown in the broken line. In the engine cranking setting, the battery 14 is connected to a conventional starter 48 through the ignition switch 40 and a neutral switch 50, which is closed in the park and neutral settings of the transmission selector, shown generally at 52. Thus, the engine can be cranked only when the ignition switch 40 is in the engine cranking setting and the transmission selector 52 is in the park or neutral setting. In this engine cranking setting of the ignition switch 40, battery power is supplied to the vehicle's ignition circuit which includes an ignition coil 54 and an ignition resistor 56. The ignition resistor 56 has the well-known function of reducing the normal system voltage to the design voltage of the ignition coil, which, to improve starting, is selected to be approximately the voltage available during cranking. Also, battery power is supplied to an indicator lamp 58 which illuminates since during engine cranking the indicator lamp 58, as can be seen, is connected to ground through the low resistance field winding 26.

As soon as the engine commences operating, the ignition switch 40 is moved to its engine operating, broken line setting and now battery power is no longer supplied to the starter 48 but it is supplied by way of a shunt resistor 60 to the AC generator's field winding 26. The shunt resistor 60 presents a lower resistance than the indicator lamp 58 so that additional current is supplied to the field winding 26. This additional current aids the AC generator 22 in commencing to develop its output. The shunt resistor 60 not only aids in providing additional current for energizing the field winding 26 but will actually pass sufficient current for this purpose if the indicator lamp 58 should be burned out. Since the shunt resistor 60 is only effective in the engine operating setting of the ignition switch 40, the indicator lamp 58 can be checked in the engine cranking setting of this ignition switch 40. In this setting the indicator lamp 58 is connected, in effect, directly across the battery 14 for maximum brilliance so that if the indicator lamp 58 does not illuminate at this time it is known to be defective.

The ignition switch 40 may have additional settings if desired; e.g., an accessory setting in which the accessories, such as the radio, the heater, etc., are provided power without the engine operating.

The operation of the fuel pump power supply circuit 20 in the various settings of the ignition switch 40 will be explained in the operational summary that follows.

Considering first the vehicle condition that can occur when the fuel tank is allowed to become empty or the vehicle is left stationary for a considerable time and the fuel lines become depleted, the vehicle operator can move the transmission selector 52 to the drive setting so as to open the neutral switch 50. This renders it impossible to operate the starter 48, but the ignition switch 40 can be moved to the engine cranking setting so that power is supplied from the battery 14 to the battery supply branch 18 of the fuel pump power supply circuit 20. Since the field relay winding 34 will be deenergized with the engine not operating, the field relay operated switch 46 will be in its upper, solid line position and the battery supply branch 18 will be connected to the fuel pump 10. The fuel pump 10 can in this way be energized for a short interval adequate to fill the depleted fuel lines, and if it is not defective, the indicator lamp 58 will illuminated. After this interval, the transmission selector 52 is moved to either the park or neutral setting so as to close the neutral switch 50 and connect the battery 14 to the starter 48. This feature is particularly advantageous when the battery output is low.

The cranking of the engine can now commence and, as mentioned, the battery 14 is connected to the ignition circuit. While the engine is being cranked, the fuel pump 10 is supplied with battery power in the just-mentioned way by the battery supply branch 18 through the field relay operated switch 46.

As soon as the engine starts to operate, the ignition switch 40 is moved to the engine running setting and, as explained, current for energizing the AC generator's field winding 26 is supplied through both the indicator lamp 58 and the shunt resistor 60. The battery supply branch 18 is disconnected from the battery 14 by the ignition switch 40 in its engine operating setting. Also, as was explained previously, the current for the field winding 26 is supplied through the voltage regulator contacts 42, which are in the solid line position. Once an output at the terminal 36 of the suggested seven-volt average magnitude is developed, the field relay 32 becomes effective and its winding 34 is energized to closed field relay contacts 38. The rectified output from the AC generator 22 is supplied directly to the field winding 26 through the closed relay contacts 38 and through the voltage regulator contacts 42, which remain in their solid line position. This rectified output is available for charging the battery 14 and appears on both sides of the indicator lamp 58 so that it now is turned off. Thus, when the field relay winding 34 is energized the output of the AC generator 22 is connected directly to the AC generator's field winding 26 and also to the indicator lamp 58, as well as to the battery by the permanent connection for the purpose of charging the battery 14 and supplying all battery-connected loads. It should now be observed that the field relay 32 cannot operate until after the engine has started. Voltage is, therefore, applied to the fuel pump 10 as long as the ignition switch 40 is manually held in the engine cranking setting. This feature provides an advantage over those circuits utilizing an engine oil pressure switch to control the fuel pump since even slow engine cranking can often develop sufficient oil pressure to operate the oil pressure switch, which will then open and prematurely disconnect the fuel pump from the power source.

When the field relay winding 34 is energized, the field relay operated switch 46 is moved to its broken line position so as to connect the DC generating system supply branch 16 to the fuel pump 10. The rectified output from the AC generator 22 is, therefore, supplied to the fuel pump 10 through the ignition switch 40 and the DC generating system supply branch 16. Consequently, the fuel pump 10 continues operation. Again, it is mentioned that the battery 14 will supply the power to the branch 16 if the AC generator's output is inadequate. When this condition exists, reverse current flow through the AC generator 12 is blocked by the diodes in the rectifier 28.

Branch 16 may include a dropping resistor 62. If included, its purpose is identical with that of the shunt resistor 56; i.e., to permit the pump 10 to be designed for a nominal voltage nearly equal to that which exists during engine cranking.

If for some reason the engine stalls or the engine is stopped, the AC generator's output will decrease and, accordingly, the voltage at the terminal 36 will decrease so that the field relay winding 34 will be deenergized. The field relay contacts 38, of course, are opened, but also the field relay operated switch 46 is moved to its solid line position now connecting the battery supply branch 18 to the fuel pump 10. Because the ignition switch 40 is in the engine operating position, the battery 14 is disconnected from the battery supply branch 18 and, hence, the fuel pump 10 receives no power and will stop operating.

As will be now appreciated, an existing vehicle DC generating system utilizing an AC generator has been utilized to provide all of the basic control for an electric fuel pump and this has been desirably accomplished with a minimum of changes both to the control system and the DC generating system. Additional relays or pressure switches for these purposes are not required.

The invention is to be limited only by the following claims.

What is claimed is:

1. In combination, an electric fuel pump for an engine-driven vehicle of the type incorporating a transmission and an engine starter, a battery, a DC generating system including an AC generator driven by the engine, the AC generator including a field winding connectable to the battery, a rectifier for converting the output from the AC generator to a DC output and a field relay responsive to an output from the AC generator, an engine operating switch connected both to the battery and the DC generating system and including an engine starting setting and an engine operating setting, a transmission selector operated switch having plural settings and being operative in one setting thereof to disconnect the engine starter from the engine operating setting, a transmission selector operated to connect the engine starter to the engine operating switch so as to crank the engine, the field relay having a deenergized state when the output from the AC generator is below some selected value and an energized state when the output from the AC generator is above the selected value, the field relay including a fuel pump control switch and a field winding control switch and being operative in the deenergized state to actuate the fuel pump control switch so as to connect the electric fuel pump to the battery in the engine starting setting of the engine operating switch thereby permitting selective operation of the electric fuel pump without cranking the engine when the transmission selector operated switch is in the one setting thereof and in the energized state to actuate both the field winding control switch so as to connect the field winding to the DC output to replace the output from the battery and the fuel pump control switch so as to connect the electric fuel pump to the DC output of the AC generator in the engine operating setting of the engine operating switch.

2. In combination, an electric fuel pump for an engine-driven vehicle of a type incorporating an engine starter and a transmission, a battery, a DC generating system including an AC generator driven by the engine, the AC generator including a field winding connectable to the battery, a rectifier for converting the output from the AC generator to a DC output and a field relay responsive to an output from the AC generator, a fuel pump power supply circuit including DC generating system supply and battery supply branches, the field relay having a deenergized state when the output from the AC generator is below some selected value and an energized state when the output from the AC generator is above the selected value, the field relay including a fuel pump control switch and a field winding control switch and being operative in the deenergized state thereof to actuate the fuel pump control switch so as to connect the electric fuel pump to the battery supply branch and in the energized state thereof to actuate the field winding control switch so as to connect the field winding to the DC output to replace the output from the battery and to also actuate the fuel pump control switch so as to connect the electric fuel pump to the DC generating system supply branch, an engine operating switch connected both to the battery and the DC output, a transmission selector operated switch for respectively connecting the engine operating switch to the starter in the transmission neutral setting thereof and disconnecting the engine operating switch from the starter in a transmission drive setting thereof, the engine operating switch having an engine operating setting in which the DC output of the AC generator is connected through the DC generating system supply branch to the fuel pump when the field relay is in the energized state thereof and an engine starting setting in which the battery output is connected to the engine starter when the transmission selector is in the neutral setting thereof and also the battery output is connected through the battery supply branch to the fuel pump.

3. In combination, an electric fuel pump for an engine-driven vehicle of a type incorporating an engine starter and a transmission, a battery, a DC generating system including an AC generator driven by the engine, the AC generator including a field winding connectable to the battery, a rectifier for converting the output from the AC generator to a DC output and a field relay responsive to an output from the AC generator, a fuel pump power supply circuit including DC generating system supply and battery supply branches, the field relay having a deenergized state when the output from the AC generator is below some selected value and an energized state when the output from the AC generator is above the selected value, the field relay including a fuel pump control switch and a field winding control switch and being operative in the deenergized state thereof to actuate the fuel pump control switch so as to connect the electric fuel pump to the battery supply branch and in the energized state thereof to actuate the field winding control switch so as to connect the field winding to the DC output to replace the output from the battery and to also actuate the fuel pump control switch so as to connect the electric fuel pump to the DC generating system supply branch, an engine operating switch connected both to the battery and the DC output, the engine operating switch having an engine operating setting in which the DC output of the AC generator is connected through the DC generating system supply branch to the fuel pump when the field relay is in the energized state threreof and an engine starting setting in which the battery output is connected through the battery supply branch to the fuel pump, the DC genertaing system supply branch including a resistor for reducing the voltage supplied therethrough to a value approximating the voltage supplied through the battery supply branch when the engine is being started.

4. In combination, an electric fuel pump for an engine-driven vehicle of a type incorporating an engine starter and a transmission, a battery, a DC generating system including an AG generator driven by the engine, the AC generator including a field winding connected to the battery, a rectifier for converting the output from the AC generator to a DC output and a field relay responsive to an output from the AC generator, a fuel pump power supply circuit including DC generating system supply and battery supply branches, the field relay having a deenergized state when the engine is not operating and an energized state when the engine is operating and the AC generator is developing an output, the field relay including a fuel pump control switch and a field winding control switch and being operative in the deenergized state thereof to actuate the fuel pump control switch so as to connect the electric fuel pump to the battery supply branch and in the energized state thereof to actuate the field winding control switch so as to connect the field winding to the DC output to replace the output from the battery and to also actuate the fuel pump control switch so as to connect the electric fuel pump to the DC generating system supply branch only after the engine is operating, an engine operating switch connected both to the battery and the DC output, the engine operating switch having an engine operating setting in which the DC output of the AC generator is connected through the DC generating system supply branch to the fuel pump when the field relay is in the energized state thereof and an engine starting setting in which the battery output is connected through the battery supply branch to the fuel pump.

5. In combination, an electric fuel pump, a DC source, a DC generating system including an AC generator provided with a field winding and a relay responsive to an output from the AC generator, and an engine operating switch connected both to the DC source and to the AC generator output for connecting the electric fuel pump and the field winding to the DC source and to the AC generator output in accordance with the relay energization and the setting of the engine operating switch, the engine operating switch including an engine operating setting in which, when the relay senses that the AC generator is developing a certain output, the AC generator output is connected to the field winding and is connected through the engine operating switch to the electric fuel pump and, when the relay senses that the AC generator is not developing the certain output, the DC source is connected through the engine operating switch to the field winding, the engine operating switch also including an engine starting setting in which, when the relay senses that the AC generator is not developing the certain output, the DC source is connected through the engine operating switch both to the field winding and to the electric fuel pump.

6. In combination, an electric fuel pump, a battery, a DC generating system including an AC generator provided with a field winding, a rectifier for converting the AC output from the AC generator to a DC output, and a field relay responsive to an output from the AC generator and being respectively energized and deenergized when the output is at a certain level and when the output is below the certain level, a fuel pump power supply circuit including DC generating system supply and battery supply branches connected respectively to the DC output of the AC generator and the battery and to the battery only, and an engine operating switch connected both to the battery and to the DC output for connecting the electric fuel pump and the field winding to the battery and to the DC output in accordance with the field relay energization and the setting of the engine operating switch, the engine operating switch including an engine operating setting, in which, when the field relay is energized, the DC output is connected to the field winding and is connected through the engine operating switch to the electric fuel pump and, when the field relay is deenergized, the battery is connected through the engine operating switch to the field winding, the engine operating switch also including an engine starting setting in which, when the field relay is deenergized, the battery is connected through the engine operating switch both to the field winding and to the electric fuel pump.

7. In combination, an electric fuel pump for an engine-driven vehicle, a battery, a DC generating system including an AC generator driven by the engine, the AC generator including a field winding, a rectifier for converting the output from the AC generator to a DC output and a field relay responsive to an output from the AC generator, the field relay having a deenergized state when the output from the AC generator is below some selected value and an energized state when the output from the AC generator is above the selected value, the field relay including a fuel pump control switch and a field winding control switch, and an engine operating switch connected both to the battery and to the DC output for connecting the electric fuel pump and the field winding to the battery and to the DC output in accordance with the field relay energization and the setting of the engine operating switch, the engine operating switch including an engine operating setting in which, when the field relay is energized, the DC output is connected to the electric fuel pump through both the engine operating switch and the fuel pump control switch and is connected to the field winding through the field winding control switch, the engine operating switch also including an engine starting setting in which, when the field relay is deenergized, the battery is connected to the electric fuel pump through both the engine operating switch and the fuel pump control switch and is connected through the engine operating switch to the field winding.

References Cited
UNITED STATES PATENTS
2,218,847 10/1940 Korte et al. _____ 290—36
3,270,208 8/1966 Carlson _____ 290—36

LAURENCE M. GOODRIDGE, Primary Examiner

U.S. Cl. X.R.
123—136, 179; 290—38

PO-1050
(5/69)

UNITED STATES PATENT OFFICE
CERTIFICATE OF CORRECTION

Patent No. 3,502,895     Dated March 24, 1970

Inventor(s) Richard P. Ballou

It is certified that error appears in the above-identified patent and that said Letters Patent are hereby corrected as shown below:

Column 5, line 44, that portion of the line reading "setting; a transmission selector operated" should read -- switch and in another setting thereof --. Column 6, line 57, "genertaing" should read -- generating --; and, in line 64, "AG" should read -- AC --.

SIGNED AND
SEALED
JUL 21 1970

(SEAL)
Attest:

Edward M. Fletcher, Jr.
Attesting Officer

WILLIAM E. SCHUYLER, JR.
Commissioner of Patents